Figure 1:
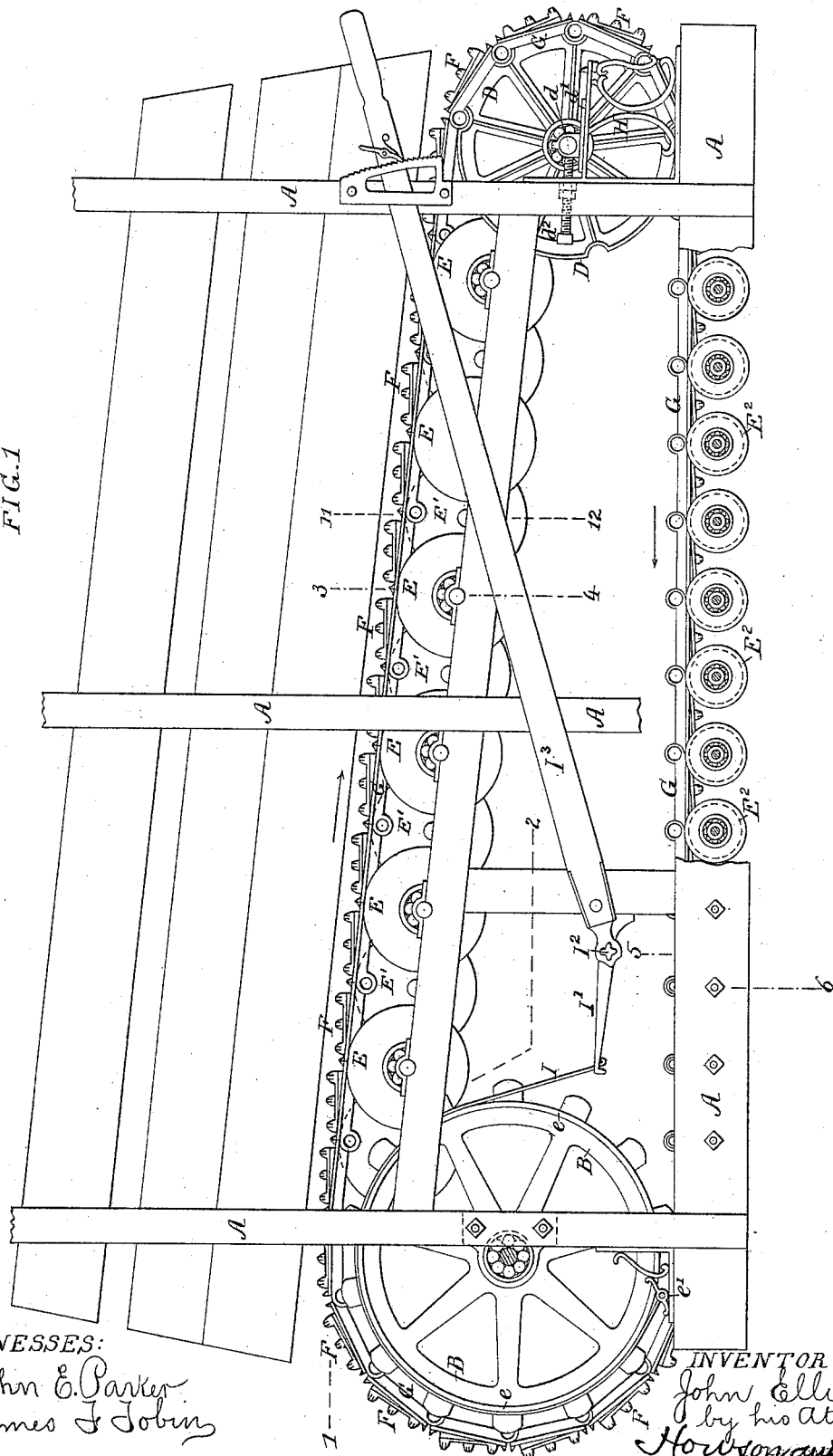

(No Model.) 4 Sheets—Sheet 1.

J. ELLIS.
HORSE POWER.

No. 299,061. Patented May 20, 1884.

WITNESSES:
John E. Parker
James F. Tobin

INVENTOR:
John Ellis
by his Attys
Howson and Sons (No Model.)  J. ELLIS.  4 Sheets—Sheet 2.
HORSE POWER.
No. 299,061.  Patented May 20, 1884.
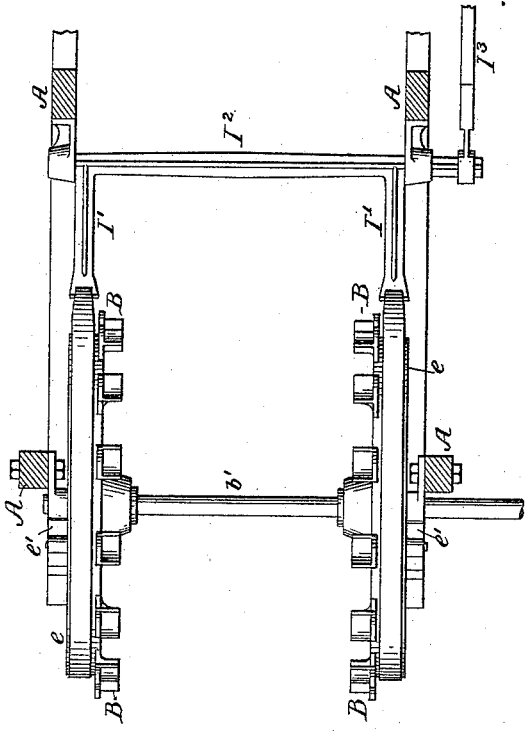
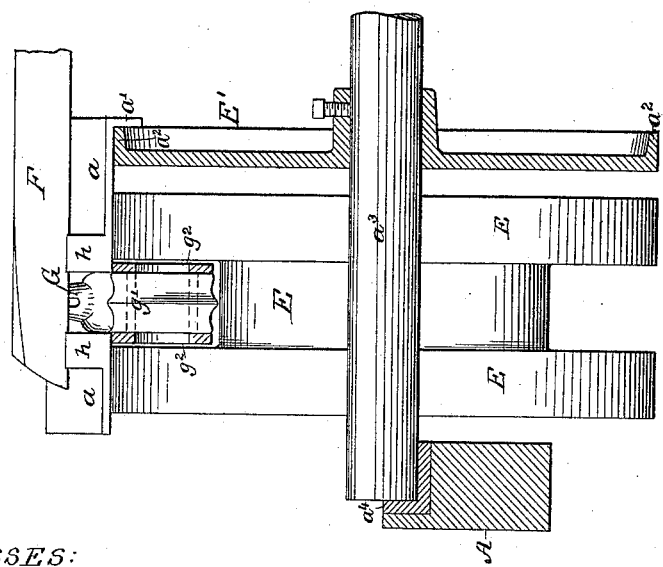
WITNESSES:
John E. Barker
James F. Tobin
INVENTOR:
John Ellis
by his Atty.
Howson and Sons

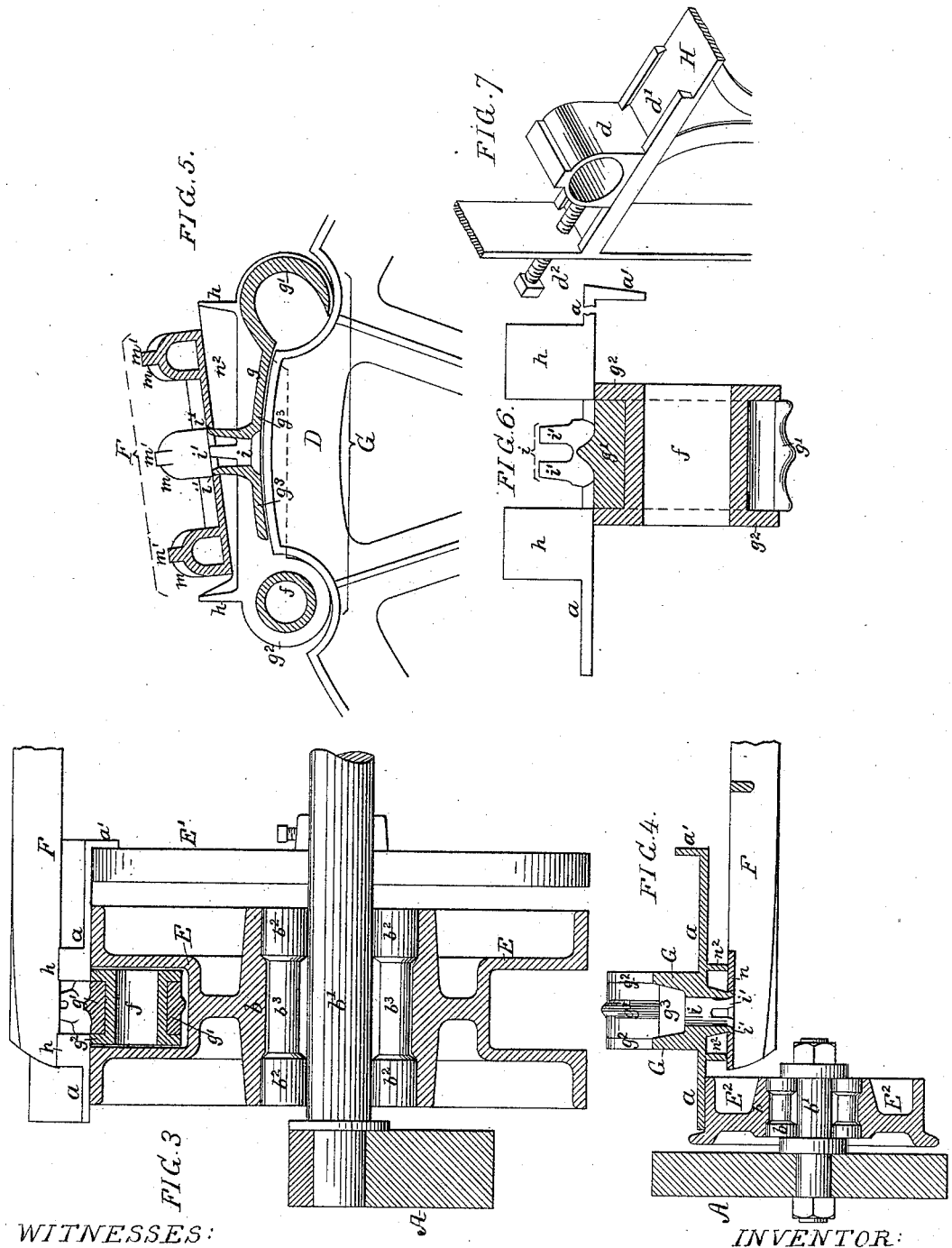

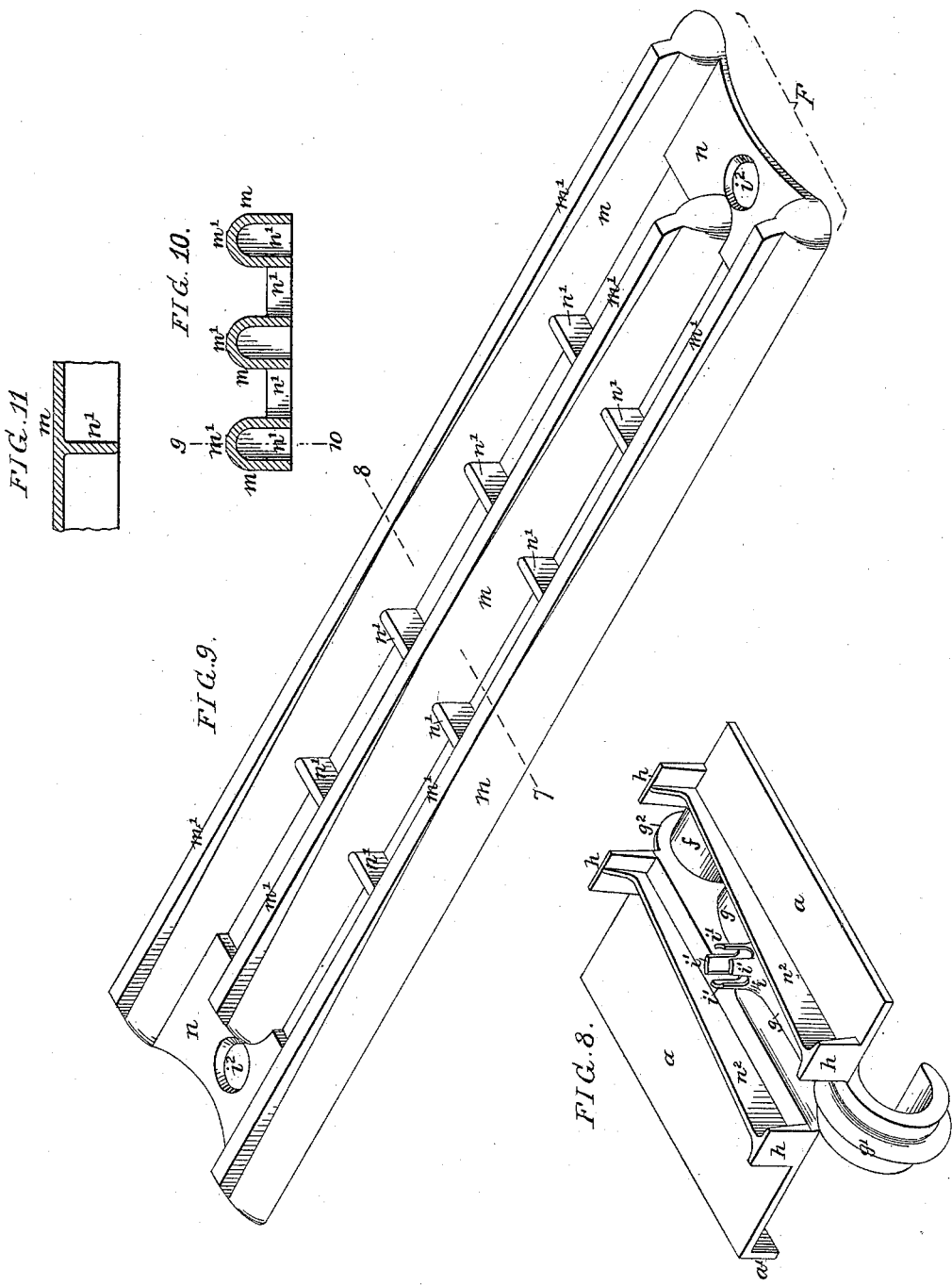

UNITED STATES PATENT OFFICE.

JOHN ELLIS, OF POTTSTOWN, PENNSYLVANIA, ASSIGNOR TO GEORGE B. ELLIS, OF SAME PLACE.

HORSE-POWER.

SPECIFICATION forming part of Letters Patent No. 299,061, dated May 20, 1884.

Application filed March 24, 1884. (No model.)

*To all whom it may concern:*

Be it known that I, JOHN ELLIS, a citizen of the United States, and a resident of Pottstown, Montgomery county, Pennsylvania, have invented certain Improvements in Horse-Powers, of which the following is a specification.

My improvements relate to the lags forming the tread of the horse-power, to the links forming the endless chain, to the means for supporting said chain and keeping the same tight, to the bearings for the various wheels, and to the brake mechanism, the particular character of the improvements being too fully set forth hereinafter to need preliminary description.

In the accompanying drawings, Figure 1, Sheet 1, is a side view, partly in section, of a horse-power with my improvements; Fig. 2, Sheet 2, a sectional plan on the line 1 2, Fig. 1, but without the chain; Fig. 3, Sheet 3, a transverse section on the line 3 4, Fig. 1; Fig. 4, a transverse section on the line 5 6, Fig. 1; Fig. 5, a longitudinal section of one of the links and a side view of part of the wheel carrying the same; Fig. 6, a transverse section of one of the link-joints; Fig. 7, a perspective view of the adjustable bearing for the shaft of the idler-pulley; Fig. 8, Sheet 4, a perspective view of one of the links of the endless chain; Fig. 9, a perspective view of one of the lags of the tread; Fig. 10, a transverse section of the same on the line 7 8; Fig. 11, a longitudinal section of part of the lag on the line 9 10, and Fig. 12, Sheet 2, a transverse section on the line 11 12, Fig. 1. Figs. 3 to 12 are on a larger scale than Figs. 1 and 2.

In Fig. 1, A represents the frame of the horse-power, which has bearings for the shaft of the sprocket-wheel B, idler-wheel D, and supporting-wheels E E', the tread of the power being composed of transverse lags F, which are secured at the ends to the connected links G, forming the opposite endless chains. The wheels E, as shown in Fig. 3, are similar to the supporting-wheels described in my former patent, dated June 20, 1882, the links having projecting flanges $a$, which run upon said wheels, the latter having deep grooves for the reception of the joints between the links. In the present machine I use an additional set of wheels, $E^2$, which serve to support the links in their return—that is to say, while they are passing in the direction of the arrow from the wheel D to the wheel B. These wheels $E^2$ are hung to studs on the base-bars of the frame, and the outer flange $a$ of each link G is wider than in my former machine, so as to project beyond the end of the lag F, and thus form a track for running upon the wheels $E^2$, as shown in Fig. 4. Each link has on its inner flange $a$ a rib, $a'$, as shown in Figs. 3 and 12, this rib running in contact with flanges $a^2$ on the wheels E', so as to prevent any movement of the tread of the power from one side to the other, the wheels E' being secured to shafts $a^3$, which are adapted to boxes $a^4$ on the frame, the outer ends of the boxes being closed, as shown in Fig. 12, so as to prevent any lateral movement of the shafts. The bearings of the wheels E $E^2$, and also of the wheels B and D, are formed in the peculiar manner shown in Figs. 3 and 4. The hub of each wheel has a central internal rib, $b$, and between the hub and the shaft or spindle $b'$ of the wheel are introduced a series of anti-friction rollers, $b^2$, each of which has a central groove, $b^3$, for the reception of the rib $b$ of the hub, the lateral retention of the rollers in the hub being thus insured. By making the rib $b$ centrally in the hub of the wheel I am enabled to use a chill for the said hub, the chill being parted in the center, so that one half can be removed from one side and the other half from the other side of the hub. The rollers $b^2$ are also chilled, or made of steel.

The boxes $d$, carrying the spindle of the wheel D, are adapted to guides $d'$ in brackets H on the frame, and each of said boxes is acted upon by a set-screw, $d^2$, by means of which it can be adjusted in its guide $d'$, so as to force the wheel D away from the wheel B, and thus take up any slack in the chains. (See Figs. 1 and 7.) Each sprocket-wheel B has an outer flange, $e$, to which is adapted a brake-strap, I, one end of which is attached to a pin on a bracket, $e'$, and the other end to an arm, I', on a rock-shaft, $I^2$, Fig. 2, adapted to bearings on the frame, and having an end of cruciform shape, adapted to an opening of like shape in an arm, $I^3$, the outer end of which can be retained in any desired position by means of a ratchet and pawl or equivalent device. (See Fig. 1.)

Each link G of the endless chain is constructed in the manner shown in Figs. 5, 6, and 8, the central bar, $g$, of the link terminating at one end in a hook, $g'$, and having at the opposite end lugs $g^2$, carrying a hollow pin, $f$, the hook $g'$ of one link being adapted to the pin $f$ of the adjoining link. Each link, with its hook and hollow pin, is cast in one piece, and the castings can be fitted together after being simply cleaned, no expensive machine-work being required. At each end of each link is a projecting lug, $h$, the lug of one link abutting against that of the next when the chain is moving in a straight line, as shown in Fig. 1, so as to afford an extended bearing for the links and enable them to better resist the thrust imparted to them. The central bar, $g$, of each link has in the under side a concave recess, $g^3$, Fig. 5, adapted for the reception of that portion of the periphery of the wheel D which is between the sockets for the joints of the links, a more extended bearing of the chain upon the wheel and a firmer hold of the latter upon the chain being thus insured than when the wheel has flat bearings between the sockets and the link has flat bearings between the joints. The links G are made of malleable iron, and on the back of each of the links is a central tubular projection, $i$, slotted vertically, so as to form fingers $i'$, as shown in Figs. 4, 5, and 8, and in each end of each lag F is formed a dovetailed opening, $i^2$, of a diameter equal to that of the projection $i$. When the lags are applied to the links, the projections $i$ enter these openings $i^2$, and the lags can then be readily secured by pressing down the fingers $i'$ into the dovetailed opening, as shown in Fig. 4, the lag being removed with equal facility on straightening the fingers.

In place of the usual wooden lags, I use a lag of metal, preferably malleable iron, each lag comprising a series of hollow longitudinal ribs, $m$—three in the present instance—as shown in Fig. 9, these ribs being connected by end plates, $n$, and by transverse braces $n'$, arranged at suitable distances apart, and preferably extending through, as well as between, the hollow ribs, as shown in Figs. 10 and 11. The ribs $m$ are tapered or reduced in height from the center toward each end, and in order that the tread shall be transversely level each rib has a central longitudinal flange, $m'$, the upper face of which is horizontal. It is advisable, also, that each lag shall present a horizontal face in the direction of the length of the tread, as well as across the same, instead of assuming the same angle as that of the link to which it is attached; hence I provide each of the links G with inclined projections $n^2$, for supporting the lags, the inclination of these projections being equal to that of the chains, whereby the upper face of each lag is caused to present a horizontal surface, as shown in Fig. 1.

I claim as my invention—

1. The combination of bearing-wheels $E^2$ on the frame of the horse-power with endless chains, the links of which have flanges $a$ projecting beyond the ends of the lags, so as to form a supporting-track for the chain on its return, as set forth.

2. The links having inner flanges $a$ with guide-ribs $a'$, as set forth.

3. The combination of the links having inner flanges with ribs $a'$, the guide-wheels $E'$, carried by shafts $a^3$, and means for confining said shafts laterally to the frame of the power, as set forth.

4. The combination of the shaft or spindle $b'$ and the centrally-grooved anti-friction rollers $b^2$ with a wheel-hub open at both ends, internally chilled and having a central rib, $b$, as set forth.

5. The combination of the sprocket-wheel, idler-pulley, and chains of a horse-power, with the frame having brackets H with guides $d'$, the boxes $d$, carrying the shaft of the idler-pulley, and set-screws $d^2$ for adjusting said boxes, as set forth.

6. The combination of a friction brake-strap and operating-lever therefor with a sprocket-wheel having a flange for the action of said brake-strap, as set forth.

7. The combination of the sprocket-wheel and its flange, the friction-strap, the bracket $e'$, the rock-shaft $I^2$, with arms $I'$, and the operating-lever $I^3$, as set forth.

8. The combination of the idler-pulley having a circular periphery with sockets, with the chain composed of connected links, each having a concave recess, $g^3$, as set forth.

9. The links G, having at each end a vertically-projecting lug, $h$, forming an end bearing, as set forth.

10. The links G, each having at one end a hook, $g'$, and at the opposite end lugs $g^2$, carrying a hollow pin, $f$, as set forth.

11. A metallic lag for the tread of a horse-power, said lag comprising longitudinal ribs and transverse connecting-bars, as set forth.

12. A metallic lag, F, comprising hollow longitudinal ribs $m$ and transverse braces $n'$, extending between and across said ribs, as set forth.

13. A metallic lag, F, comprising longitudinal ribs $m$, tapered from the center toward each end, and having a top flange, $m'$, in combination with connecting plates and braces for said ribs, as set forth.

14. The combination of a link, G, having a tubular projection, $i$, with a metallic lag, F, having end plates with openings $i^2$, as set forth.

15. The combination of the lags F with the links G, each having inclined projections $n^2$, forming the bearings for the lag, as set forth.

In testimony whereof I have signed my name to this specification in the presence of two subscribing witnesses.

JOHN ELLIS.

Witnesses:
 JOHN E. PARKER,
 HENRY HOWSON, Jr.